March 1, 1966  J. E. BEGGS  3,238,410
GRID FOR ELECTRIC DISCHARGE DEVICE AND METHOD OF MAKING
Filed Nov. 21, 1962
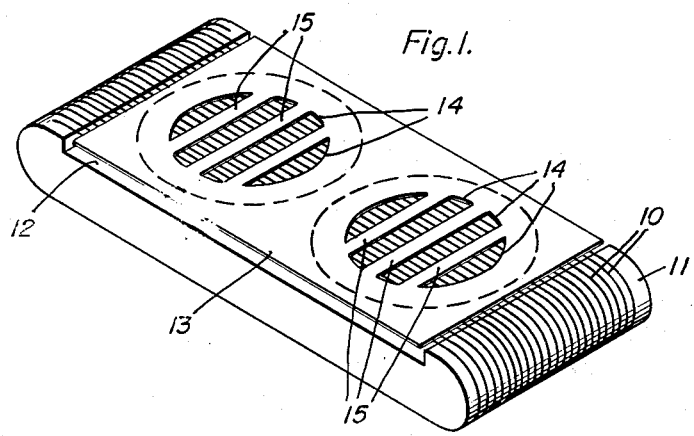
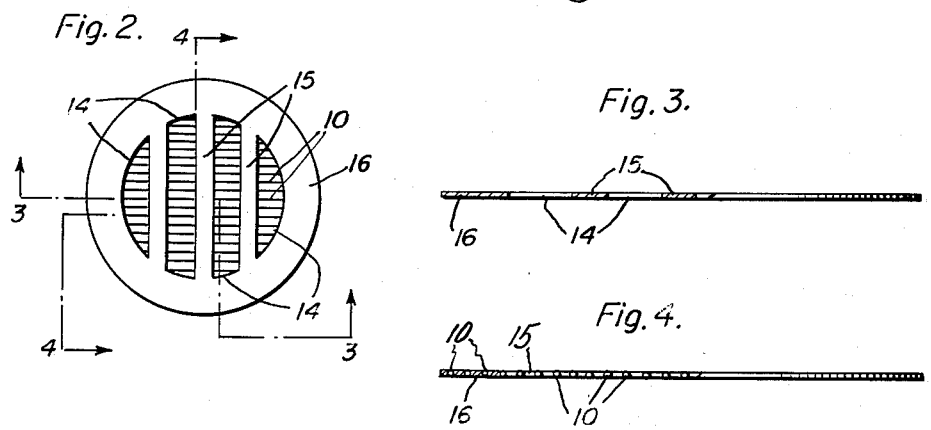
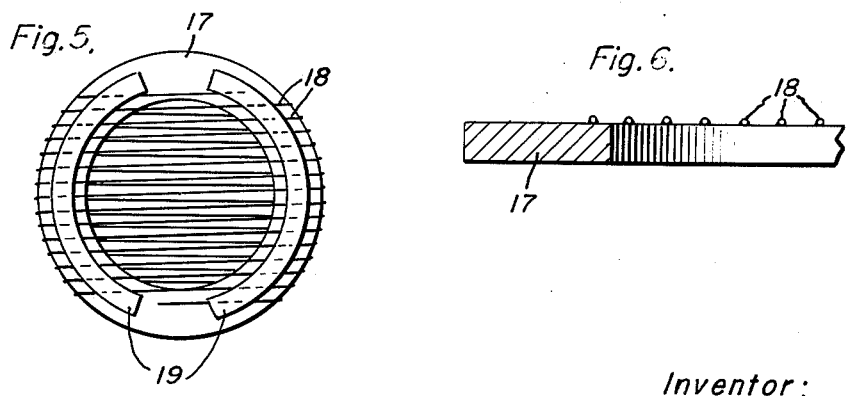
Inventor:
James E. Beggs,
by Richard R. Brainard
His Attorney.

United States Patent Office 3,238,410
Patented Mar. 1, 1966

3,238,410
GRID FOR ELECTRIC DISCHARGE DEVICE AND METHOD OF MAKING
James E. Beggs, Schenectady, N.Y., assignor to General Electric Company, a corporation of New York
Filed Nov. 21, 1962, Ser. No. 239,115
7 Claims. (Cl. 313—348)

The present invention relates to improved grid structures for electric discharge devices and to an improved method of making such grids.

In electric discharge devices, particularly in such devices for use at high frequencies, the control grid must meet rather severe requirements of accuracy of dimension and stability of shape over a wide range of temperature. In one form of grid which is widely used, the grid wires are bonded to a grid frame which is most frequently in the form of an annular washer. Attempts to improve the shape stability of these grids have been made by bonding reinforcing wires to the grid wires which tend to take up the slack in the grid wires resulting from the temperature gradient over the area of the grid which tends to be produced during operation. The present invention relates to an improved and simplified grid construction which has good shape stability in electric discharge devices operating at or processed at high temperature and to an improved and simplified method of making such grids.

In accordance with an important feature of the present invention, the grid wires are bonded together by an improved brazing alloy which is relatively viscous and tends to be relatively immobile and not to ball up or otherwise form unwanted projections on the finished structure. Such an alloy is provided by an alloy of thorium and a metal selected from the group consisting of titanium and zirconium with the percentage of thorium being such as to provide an alloy near the eutectic alloy, preferably sufficiently close to the eutectic so that the melting point thereof does not exceed the melting point of the eutectic alloy by more than 150°. In accordance with the preferred embodiment of the invention, the grid frame is formed directly by melting a body of the solder and solidifying it in place as the grid frame. In carrying out this feature of the invention a sheet of the alloy aproximately of the thickness of the grid wires has an aperture or apertures formed therein corresponding to the opening or openings of the finished grid. The alloy sheet is superimposed on the grid wires and heated in vacuum to the melting point of the alloy so that it settles into the spaces between the grid wires and forms the grid frame essentially in the same plane as the plane of the wires. The alloy sheet may be provided with suitable cross members which form integral reinforcing ribs in the finished grid. While it is possible to stamp out the alloy sheet prior to melting into the grid frame, it may also be left in the form of a sheet and the finished composite grid stamped from the sheet after the grids have been made. More conventional grid structures employing a preformed grid frame with a plurality of refractory grid wires may be formed, to advantage, utilizing the above-described thorium alloy as the brazing material. Since the material is viscous it tends to stay in place and not to form any projections or irregularities on the grid surface, finished grids of uniformly accurate dimensions are readily produced. The alloy also has a lower vapor pressure and accordingly permits high temperature processing and contributes to stable operation with high emission densities.

The objects and advantages which characterize my invention will be better understood as the following description proceeds, reference being had to the accompanying drawing, and its scope will be pointed out in the appended claims. In the drawing:

FIG. 1 is an isometric view illustrating the parallel grid wires assembled on the support with the overlying alloy sheet;
FIG. 2 is a plan view of a finished grid;
FIG. 3 is an elevational view in section taken along lines 3—3 of FIG. 2;
FIG. 4 is an elevational view in section taken along the line 4—4 of FIG. 2;
FIG. 5 is a plan view of a modified form of my invention in the process of manufacture; and
FIG. 6 is a sectional view of a finished grid of the type shown in FIG. 5.

In FIG. 1 of the drawing I have shown the components of a grid structure embodying my invention in an intermediate stage of manufacture. As there shown, a plurality of grid wires 10 are wound on a grid frame 11 which is in the form of a generally rectangular body of refractory material, either a refractory metal or a ceramic, which is recessed from one face thereof over substantially the entire area, as indicated at 12, to provide an extended area of unsupported grid wires. Overlying the unsupported area of the grid wires is a thin sheet of alloy material 13, preferably of substantially the same thickness as the diameter of the grid wires and having openings formed therein corresponding to the desired openings in the finished grids. When an alumina body is employed it need not be recessed since the alloy of sheet 13 does not tend to stick to alumina. As illustrated, the openings 14 are generally circular and are subdivided by a plurality of bars or reinforcing members 15 which extend across the openings in a direction parallel to the diameter thereof and transversely of the grid wires. The number and width of these bars may be selected in accordance with the amount of support desired and with the amount of open area desired in the finished grid.

With the parts assembled in the position illustrated in FIG. 1 of the drawing, the grid may be completed by placing the assembly in a bell jar which is exhausted and the parts then heated to the melting point of the alloy sheet. The alloy settles between the wires and is essentially coplanar therewith and since the thickness of the alloy is essentially the same as the diameter of the wires, it does not protrude materially on either side of the wires. After the assembly has cooled the grids may be completed by stamping out composite circular members of larger diameter than the openings 14 to provide the finished grids which as shown in FIGS. 2, 3 and 4 have an integral grid frame 16 with the reinforcing bars 15 extending orthogonally to the grid wire 11 with the frame and bars coplanar with the grid wires.

As a specific example of my invention, the grid wires are of 1 mil tungsten and are wound on a support also of tungsten, with a spacing to provide 300 grid wires per inch. The alloy sheet is the eutectic alloy of thorium and titanium, i.e., an alloy of 88 percent by weight thorium and 12 percent by weight titanium and having a melting temperature of about 1190° C. As shown in the drawing the alloy sheet is placed on the grid wires and is provided with openings 14 .350 inch in diameter each with three grid wire supporting bars 15 approximately 10 mils in width. The assembly as shown in FIG. 1 is placed within a bell jar which is exhausted and the temperature of the parts raised, preferably by means of a high frequency induction coil, to a little above 1190° C. As the alloy sheet melts, it settles and fills the space between the wires and since it is the same thickness as the diameter of the wire, it is essentially coplanar therewith. It is then allowed to cool and removed from the bell jar and the composite grid as shown in FIG. 2 may be stamped from the assembly as a punch press operation. It will be readily understood that the alloy sheet may be punched before the assembly so that the sheet is replaced by washers of the alloy having the same outline in plan as shown in FIG. 2.

While tungsten has been mentioned as the grid wire material and is the one commonly used, it will be appreciated that other refractory metals such as molybdenum, tantalum, niobium, rhenium or alloys thereof may also be employed. Also, it will be readily appreciated that the invention is not limited to the use of the eutectic alloy and that alloys having greater or less amounts of thorium may be employed. As a practical range the thorium may vary between 70 and 92 percent with the titanium varying between 30 and 8 weight percent. The extremes of this range both provide a melting point of approximately 1350° C. As indicated earlier, the titanium-thorium alloys are viscous and do not flow to an undesirable extent or ball up or otherwise form projections on the grid structure. Accordingly, this makes possible the integral grid frame bonding material formed of the alloy material. Zirconium-thorium alloys exhibit these properties to a considerable extent and it is within the scope of my invention in its broader aspects to utilize such zirconium-thorium alloys. The eutectic alloy is 75 percent by weight thorium and 25 percent by weight zirconium and has a melting temperature of approximately 1250° C. Zirconium-thorium alloys having compositions lying between 65 and 85 percent thorium and 35 and 15 percent zirconium are satisfactory and these alloys have melting points which at the extremes of the range are 150° above the melting point of the eutectic alloy.

While the present invention is particularly advantageous in making grids in which the grid frame is coplanar with the grid wires, grids having preformed grid frames may also be fabricated to advantage with the alloys described above. Such a grid is shown in FIGS. 5 and 6. In this modification a grid frame 17 in the form of an annular washer of tungsten, for example, has wound thereon a plurality of parallel tungsten grid wires 18. Overlying the grid wires 18 where they cross the grid washer 17 are placed shims 19 of the thorium-titanium or thorium-zirconium alloy having the compositions described above. The grid may be completed then by heating in vacuum to melt the alloy and bond the grid wires to the grid frame. The grid wires are then cut at the edge of the washer to remove the wires on the back side of the grid washer. Since the alloy material has a low vapor pressure and is viscous and does not tend to ball up, it provides grids having uniform dimensions with no protrusions and also grids which have a minimum tendency to give off vapor during operation at elevated temperatures.

While my invention has been illustrated and described in connection with what may be considered a bath process, it is apparent that it is well suited for a continuous process in which the grid wires and alloy are advanced into a processing region in a continuous manner.

From the foregoing it is apparent that my invention provides a new and improved grid structure and method of making which is particularly suited for high temperature high frequency discharge devices where dimension and shape stability are important.

While I have described and illustrated particular embodiments of my invention, it will be apparent to those skilled in the art that changes and modifications may be made without departing from my invention in its broader aspect and I aim, therefore, in the appended claims to cover all such changes and modifications as fall within the true spirit and scope of my invention.

What I claim as new and desire to secure by Letters Patent of the United States is:

1. The method of making a grid which comprises supporting a plurality of grid wires of refractory material in spaced parallel relation, superimposing on said wires a sheet of alloy material having substantially the same thickness as the diameter of said grid wires and having an opening therein corresponding in shape and size to the opening desired in the grid structure, heating said superimposed sheet of alloy and wires in vacuum to the melting point of said alloy to form a grid frame of said alloy substantially coplanar with said grid wires, said alloy consisting essentially of thorium and a metal selected from the group consisting of titanium and zirconium, with the percentage of thorium being such that the melting point of the alloy does not exceed the melting point of the eutectic alloy by more than 150° C.

2. The method of making a grid which comprises supporting a plurality of grid wires of refractory material in the relative positions to be occupied in the finished grid, superimposing on said wires a sheet of alloy material having an opening therein corresponding in shape and size to the opening desired in the grid structure, heating said superimposed sheet of alloy and wires in vacuum to the melting point of said alloy, said alloy consisting essentially of thorium and a metal selected from the group consisting of titanium and zirconium, with the percentage of thorium being such that the melting point of the alloy does not exceed the melting point of the eutectic alloy by more than 150° C.

3. The method of making a grid which comprises supporting a plurality of grid wires of refractory material in spaced parallel relation, superimposing on said wires a sheet of alloy material having substantially the same thickness as the diameter of said grid wires and having an opening therein corresponding in shape and size to the opening desired in the grid structure, heating said superimposed sheet of alloy and wires in vacuum to the melting point of said alloy, said alloy consisting essentially of thorium and titanium in essentially eutectic proportions.

4. A grid structure for an electric discharge device comprising a plurality of spaced parallel grid wires of refractory metal and a grid frame for joining said wires together and holding said wires in planar relation and lying in the same plane as said grid wires, said frame consisting essentially of an alloy of thorium and a metal selected from the group consisting of titanium and zirconium and the percentage of thorium in said alloy lying within limits which provide a melting point of the alloy which is not more than 150° C. above the melting point of the eutectic alloy.

5. A grid structure for an electric discharge device comprising a plurality of spaced parallel grid wires of refractory metal and a grid frame including a plurality of integral bars extending transversely with respect to said parallel grid wires, for joining said wires together and holding said wires in planar relation and lying in the same plane as said grid wire, said frame consisting essentially of an alloy of thorium and a metal selected from the group consisting of titanium and zirconium and the percentage of thorium in said alloy lying within limits which provide a melting point of the alloy which is not higher than 150° C. above the melting point of the eutectic alloy.

6. A grid structure for an electric discharge device comprising a plurality of spaced parallel grid wires of refractory metal and a grid frame for supporting said wires in planar relation, and means bonding said wires to said frame comprising an alloy of thorium and a metal selected from the group consisting of titanium and zirconium with the percentage of thorium in said alloy lying within limits which provide a melting point of the alloy which is not higher than 150° C. above the melting point of the eutectic alloy.

7. A grid structure for an electric discharge device comprising a plurality of spaced parallel grid wires of refractory metal and a grid frame for joining said wires together and holding said wires in planar relation and lying in the same plane as said grid wires, said frame consisting essentially of the eutectic alloy of thorium and titanium.

No references cited.

JAMES D. KALLAM, *Acting Primary Examiner.*

R. F. POLISSACK, *Assistant Examiner.*